Dec. 4, 1956 V. F. MERCALDO 2,772,726
CIRCUMFERENTIALLY TRAVELING TYPE TIRE
MOUNTING AND DEMOUNTING APPARATUS
Filed Sept. 16, 1952 3 Sheets-Sheet 2
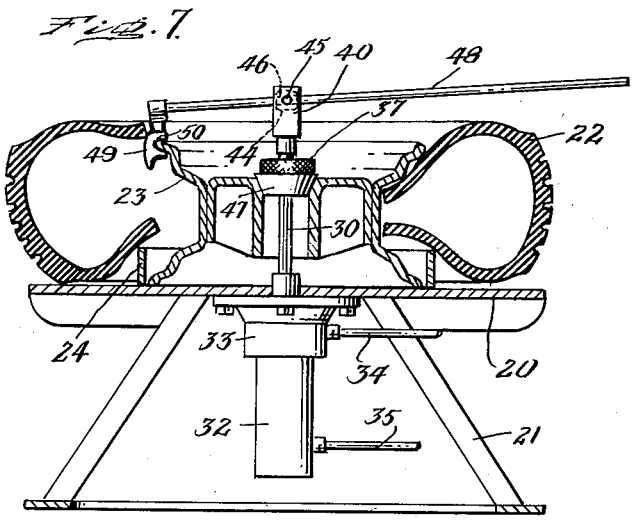
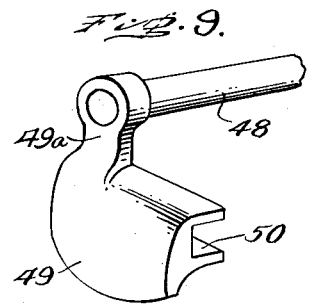
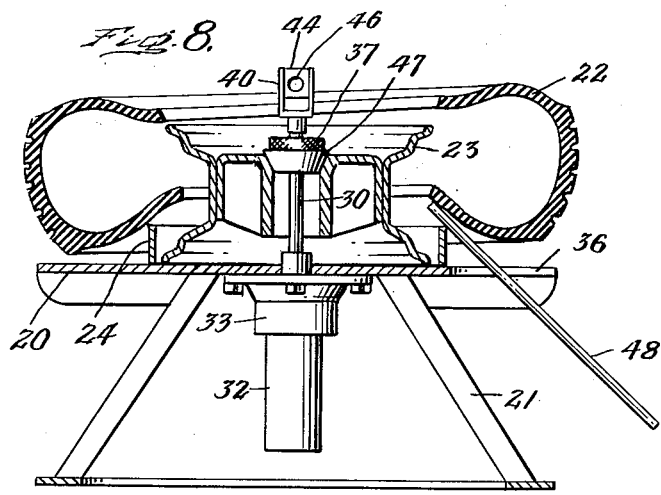
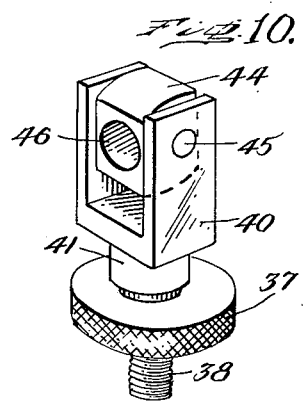
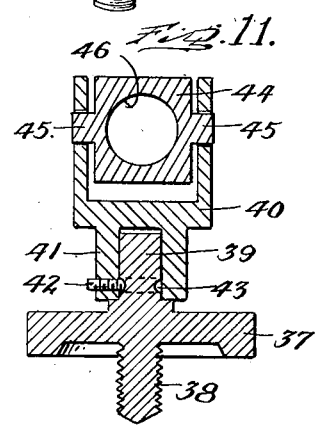
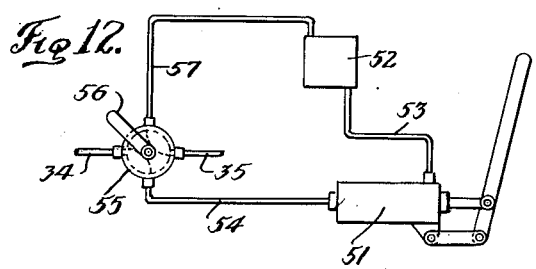
INVENTOR
Vincent F. Mercaldo.
BY
Harris S. Campbell
ATTORNEY Dec. 4, 1956 V. F. MERCALDO 2,772,726
CIRCUMFERENTIALLY TRAVELING TYPE TIRE
MOUNTING AND DEMOUNTING APPARATUS
Filed Sept. 16, 1952 3 Sheets-Sheet 3
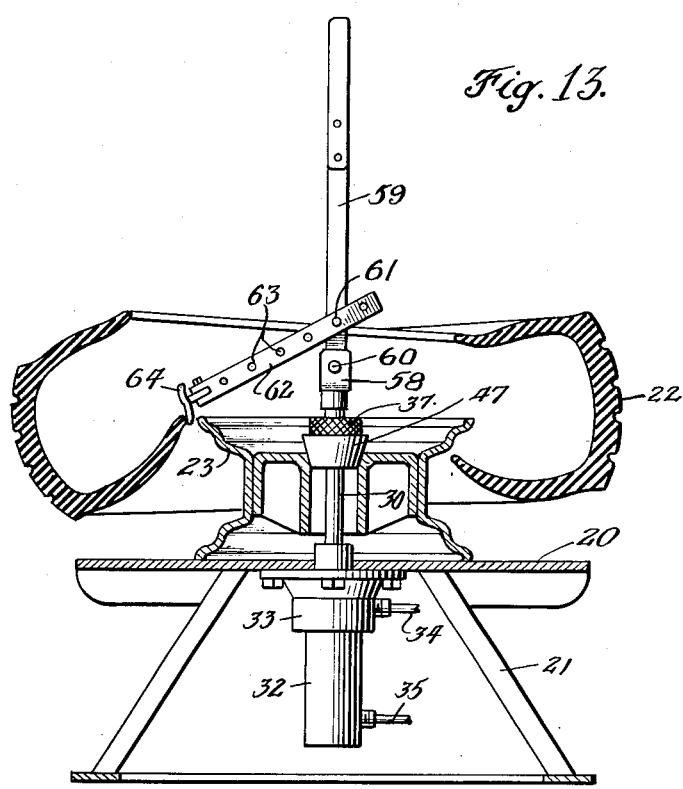
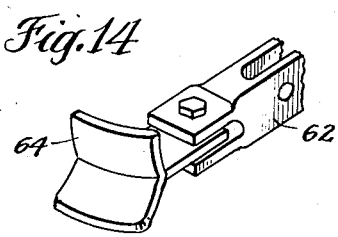
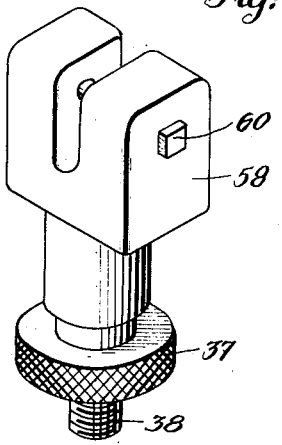
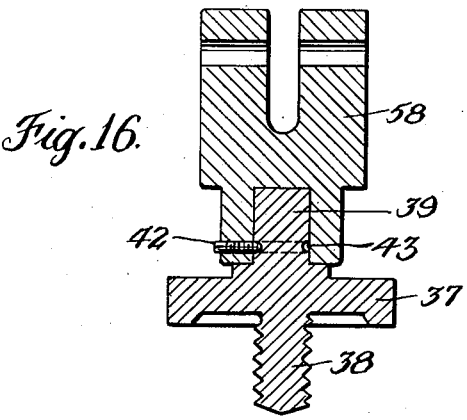
INVENTOR
Vincent F. Mercaldo
BY
Harris S. Campbell
ATTORNEY

United States Patent Office 2,772,726
Patented Dec. 4, 1956

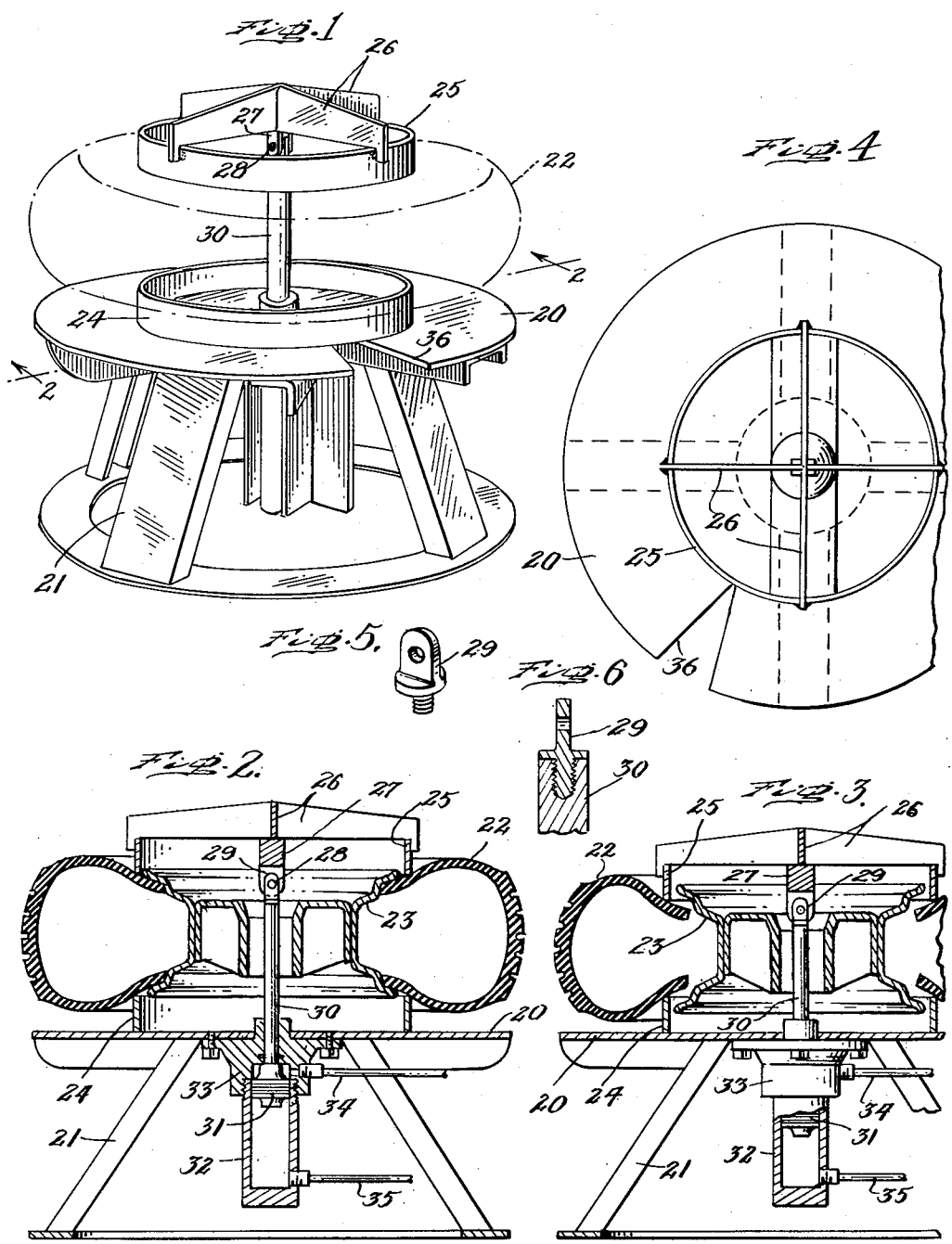

2,772,726

CIRCUMFERENTIALLY TRAVELING TYPE TIRE MOUNTING AND DEMOUNTING APPARATUS

Vincent F. Mercaldo, Philadelphia, Pa.

Application September 16, 1952, Serial No. 309,884

5 Claims. (Cl. 157—1.24)

This invention relates to equipment for servicing pneumatic tires and is particularly concerned with apparatus for removing tire casings from wheel rims or mounting them thereon.

Large tires such as used on heavier aircraft or trucks are difficult to apply or remove from their wheels or rims. Such tires are relatively heavy and inflexible so that it is desirable to supply special equipment to break the tire away from the inside of the rim and remove it therefrom when repair or replacement of the tire is necessary.

One of the primary objects of the present invention is the provision of improved apparatus for applying a separating pressure to force the tire casing away from the inner sides of the rim together with means for subsequently removing the tire from the rim.

Another object is to provide a supporting table with suitable pressure rings to force the casing from both sides of the rim in a single operation. Preferably the pressure applied to the rings is through a hydraulic cylinder and piston. Power for applying the pressure may be supplied either by a mechanically driven pump or by a manually actuated pump.

A further specific object is the provision of readily attachable and detachable mechanism of special design for removing the tire from the rim, including a lever which may be swung in a complete circle around the rim.

A still further object of the invention is the provision of a force multiplying applicator mechanism for use in applying a tire casing into position on a rim.

Still another object is the provision of quick-acting holding mechanism for retaining the wheel in position during the operation of removing or applying a tire.

How these and other objects and advantages are accomplished will be clear by reference to the drawings, in which—

Figure 1 is a perspective view of the tire stand of the present invention with the rings for removing a tire in position.

Figure 2 is a sectional view of the apparatus of Figure 1 showing the relative position of the parts with respect to the tire and wheel, the section being taken substantially on the line 2—2 of Figure 1.

Figure 3 is a sectional view similar to Figure 2 but with the actuating parts in another position.

Figure 4 is a plan view of the table and pressure application rings.

Figure 5 is a perspective view of an eyebolt terminal.

Figure 6 is a sectional view of the terminal of Figure 5 shown in attached position at the top of the piston rod.

Figure 7 is a sectional view somewhat similar to Figure 3 but with the upper pressure ring removed and the equipment for removing the tire from the rim in position.

Figure 8 is a sectional view generally similar to Figure 7 but showing one side of the tire removed and illustrating one manner of finally removing the tire.

Figure 9 is a perspective view of a special rim and tire engaging tool.

Figure 10 is a perspective view of a removable terminal used to support the tool shown in Figure 9.

Figure 11 is a sectional view of the terminal shown in Figure 10.

Figure 12 is a schematic illustration of a pressure system suitable for use with the ring pressure applicators.

Figure 13 is sectional view showing another tool mounted and illustrating the manner in which it is used to apply a tire to the rim.

Figure 14 is a perspective view of the tire engaging terminal of the tool of Figure 13 shown to an enlarged scale.

Figure 15 is a perspective view of the terminal used for supporting the tire tool shown in Figure 13, and Figure 16 is a sectional view of the terminal of Figure 15.

Referring to Figures 1–3 it will be seen that a support having a top 20 with supporting legs 21 is arranged to hold a tire 22 and wheel 23 while an operator removes or replaces a tire casing. Normally an inner tube is used inside the casing but this is omitted to simplify the disclosure since it in no way affects the operation of the equipment.

Removal of a tire from the wheel rim is greatly simplified by the use of the present equipment which provides a quick and effective way of breaking the tire away from the sides of the rim. Long mounting with internal pressure from the tire urging it into contact with the rim causes it to adhere tightly, requiring a considerable pressure to separate the tire from the rim edges as the first step in removal. To perform this operation with the present equipment a bottom ring member 24 is placed upon table 20 so as to engage and support the tire 22 just outside the periphery of the rim of the wheel 23. Another upper ring 25 is placed on the upper side of the tire 22. Ring 25 has a spoke-like bridge structure consisting of members 26 arranged to provide a central point for the application of a load. Attached to the center is a fitting 27 having a fork incorporating apertures through which a bolt or pin 28 may be inserted.

The fitting 27 is anchored to another eyebolt fitting 29 which in turn is attached to the upper end of piston rod 30. This fitting 29 and its attachment to rod 30 are clearly shown in Figures 5 and 6 where it will be observed that fitting 29 may be threaded into the top of rod 30 to provide for rapid attachment or removal.

As will be most readily seen in Figure 2 the piston rod 30 is connected to piston 31 located in cylinder 32 mounted underneath the table 20. Cylinder 32 is attached to the head or support 33 which in turn is bolted to the supporting table 20. A hydraulic or pneumatic line 34 connects to the upper end of cylinder 32 while line 35 connects to the lower end of the cylinder. Application of pressure through line 34 causes pressure on the upper side of piston 31 urging it in a downward direction to cause the tire to be separated from the rim as indicated by the position of parts illustrated in Figure 3. As soon as the rim is freed from the tire the wheel 23 will of course drop down until it is supported on table 20.

Figure 4 shows the plan view of the table 20 and ring 25. Notch or slot 36 is shown in table plate 20 in Figure 4 and also in Figure 1. The purpose of slot 36 will be clear as the description proceeds. It will also be understood that rings of varying diameter will be used for wheels and tires of different sizes.

After tire 22 has been released from the edges of the rim as described in connection with Figure 3, the upper ring 25 and its structure 26 are removed from the piston rod 30 by unscrewing the eyebolt 29 thereby freeing the complete assembly. Referring to Figures 7 to 11 inclusive the next step in the removal process will be clear. The supporting assembly illustrated in Figures 10 and 11 are first attached to the upper end of rod 30. It will be seen that the lower portion of the fitting assembly consists of a small hand wheel 37 having a threaded stud 38 projecting downwardly and an upwardly projecting cylindrical portion 39. A forked member 40 having a cylindrical socket 41 fits over cylinder 39 and is attached thereto by set screw 42 which engages groove 43 to allow rotational movement between the parts. Mounted in fork 40 is a block 44 having trunnions 45 projecting into suitable apertures in fork member 40. Block 44 incorporates a cylindrical aperture 46.

As will be seen from Figure 7 the assembly described just above is connected to piston rod 30 after first placing the tapered block 47 in position on the rod 30. Application of pressure to the upper side of piston 31 then will draw the assembly down so that the tapered block 47 enters the hub of wheel 22 and centers and holds it rigidly in position on table 20.

A special tire removing tool is illustrated in Figure 9 where it will be seen that rod 48 has supported at its end a specially shaped fitting 49. Fitting 49 has a groove or channel 50 along one side for engaging the rim of wheel 23 during the tire removing process. The other side of fitting is smooth and curved so that the edge of the tire can ride over it easily. Figure 7 shows rod 48 in position in aperture 46 of block 44 and fitting 49 in position between the tire 22 and the rim. It will be observed that at the right of Figure 7 the tire edges have been pulled into the center channel of the wheel 23 to permit the left hand upper edge to be placed over the outside of fitting 49. By swinging the rod 48 around through a complete circle the upper edge of the tire is quickly transferred to the outside of the rim to the position illustrated in Figure 8.

As will be clear from Figure 8 the final operation of removing the tire is quickly accomplished as follows. The rod 48 is inserted under the lower edge of tire 22 through slot 36 in table 20. Rod 48 is inserted until the end is placed above the edge of the upper rim of the wheel 23. The outer end of rod 48 is then raised to pry the bottom edge of the tire over the rim and the rod 48 pushed around the rim to completely remove the tire casing 22.

One manner of providing the pressure for actuating cylinder 32 is illustrated in Figure 12. A hand operated pump 51 obtains its fluid supply from tank 52 through line 53 and delivers pressure to line 54. Valve 55 controls the delivery of pressure to either line 34 or line 35. By moving handle 56 from the position shown pressure may be applied to line 35 instead of line 34. In this event line 34 is connected to return line 57 and piston 31 is pushed upwardly. A power operated pump may be used in place of pump 51 in which case it is desirable to use a pressure relief valve in the pump or line 54.

Figures 13 to 16 inclusive show special apparatus used for applying the tire into position over the wheel rim. Here it will be seen that the wheel is set up substantially the same as in Figures 2 and 3 except that the lower ring 24 is removed from the table 20. The tapered block 47 is held in position by hand nut unit 37 but a special application tool is supported thereon. As shown in Figures 15 and 16 the fork member 58 is mounted on supporting cylinder 39. Handle 59 is supported on fork 58 by means of pivot 60. Handle 59 incorporates a second pivot 61 above pivot 60 to which is connected cross arm 62. Cross arm 62 has several circular holes 63 to accommodate pivot 61 to permit adjustment to suit different sized tires.

Figure 14 shows the terminal member 64 with its shape adapted to fit the inside edge of a tire for applying pressure thereto during the process of application. With one edge of the tire applied over the rim as shown to the right of Figure 13, pressure is applied to the edge of the tire to force it over. The mechanical advantage developed by the handle 59 assists in quickly pushing a portion of the edge over the rim and moving around to another position until the edge is completely over. To apply the upper edge of the tire over the rim the handle 59 and assembly is removed by taking off the fork 58. In its place is mounted the assembly shown in Figure 7 composed of trunnion fork 40, rod 48 and terminal 49. One portion of the upper edge of the tire is started over the rim. Then with the tire edges in the drop-center part of the wheel the tool 49 is placed on the rim with channel 50 in position in the area of the portion of the tire already in place over the rim. Then by rotating the rod 48 to move the terminal tool 49 around the edge of the tire, the edge or bead is easily and quickly pushed over the rim edge into position. This action is due to the relationship of the curved portion 49 and the post portion 49a extending above surface 49. Thus, once the tire is started on the rim, rotation of the rod in the proper direction (opposite to the removing direction previously described in connection with Figure 7) the bead of the tire is caused to "flow" into position inside the rim. The tire is then ready for inflation and the assembly may be removed from the table.

From the foregoing description it will be evident that my improved equipment provides for rapid and easy removal or application of a tire casing. The simple ring members adapted to apply their break away pressure by means of a hydraulic or pneumatic cylinder provide for rapid and readily controlled operation. The special bead and rim engaging tool which may be mounted on the piston rod permits rapid separation of the upper edge with a minimum of effort. The simple notch and rod insertion method of final removal is highly effective as also is the application by means of the special tool with built-in mechanical advantage. Holding the wheel unit by cylinder pressure applied through the tapered hub engaging block assists the operator in performing the operations without difficulty. The inner tube may conveniently be removed from the tire or inserted therein while the upper bead of the tire is in the removed position.

I claim:

1. Equipment for servicing tires including a table for supporting a tire and rim, a vertical rod projecting from said table at a central location with respect to the tire and rim when in position, a detachable fitting for slidably, rotatably and pivotally connecting a tire manipulating device to the upper end of said vertical rod, said device incorporating an elongated handle, a tire and rim engaging part attached to and located below said handle, said part having a groove formed by two flanges at its inner side for engaging the peripheral edge of the rim and a smooth curved external surface for engaging the edge of the tire and moving it to the outside of said rim when said device is rotated about the axis of said rod in one direction and for moving the edge of the tire into position inside the rim when rotated in the opposite direction.

2. Equipment for servicing tires including a table for supporting a tire and rim, a vertical rod projecting from said table at a central location with respect to the tire and rim when in position, a device for removing the tire from the rim incorporating an elongated handle, a detachable fitting for engaging the top of said rod, said fitting incorporating a part rotatable about the rod axis, a block member supported on a horizontal pivot in said fitting, said block member having an aperture with its axis transverse to the axis of said pivot to support said handle for movement to allow radial extension, raising or lowering the end of said handle, and rotation about the vertical rod axis, tire and rim engaging means connected to said handle.

3. Tire mounting and demounting apparatus including a horizontal table for supporting a rim and tire, a vertically mounted cylinder and piston unit supported under said table, a piston rod extending vertically from the center of the table, a terminal fitting having a direct threaded connection co-axial with the axis of said rod attaching it thereto, said fitting having a part attached thereto but rotatable therewith about the axis of said rod, a horizontal pivot in said part intersecting the axis of said rod and a lever member supported on said part, a tire engaging element at the end of said lever and a wheel clamping part supported on said piston rod below said fitting.

4. Tire mounting and demounting apparatus including a horizontal table having a surface larger in diameter than the wheel to which the tire is applied, a cylinder and piston unit having a rod extending above the center of the table, a threaded member attached to the upper end of the rod having a hand wheel member attached thereto, a conical wheel positioning and clamping part mounted on said rod and engaging said hand member, a block pivotally supported above said threaded member and having an aperture therein, a rod with a tire removing terminal member extending from said block and supported in said aperture.

5. A construction in accordance with claim 2 in which said vertical rod extends downwardly to a piston and cylinder, a wheel clamping device supported on said rod adjacent said fitting.

References Cited in the file of this patent

UNITED STATES PATENTS

| | | |
|---|---|---|
| 922,541 | Swinehart | May 25, 1909 |
| 1,025,987 | Long | May 14, 1912 |
| 1,208,184 | Mayer | Dec. 12, 1916 |
| 2,034,819 | Maulis | Mar. 24, 1936 |
| 2,065,644 | Bristol | Dec. 29, 1936 |
| 2,418,849 | Polt | Apr. 15, 1947 |
| 2,471,642 | Moltz | May 31, 1949 |
| 2,505,172 | Coats | Apr. 25, 1950 |
| 2,566,315 | Christofoli et al. | Sept. 4, 1951 |
| 2,569,789 | Weaver | Oct. 2, 1951 |
| 2,595,258 | Hildred | May 6, 1952 |

FOREIGN PATENTS

| | | |
|---|---|---|
| 454,352 | Canada | Feb. 1, 1949 |
| 969,105 | France | Dec. 14, 1950 |